(12) United States Patent
Zaman et al.

(10) Patent No.: US 9,207,849 B2
(45) Date of Patent: Dec. 8, 2015

(54) START AND APPLICATION NAVIGATION

(71) Applicant: Microsoft Corporation, Redmond, WA (US)

(72) Inventors: Nazia Zaman, Kirkland, WA (US); Adrian Garside, Seattle, WA (US); Allison Gallant, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 180 days.

(21) Appl. No.: 13/853,957

(22) Filed: Mar. 29, 2013

(65) Prior Publication Data

US 2014/0298250 A1    Oct. 2, 2014

(51) Int. Cl.
| | | |
|---|---|---|
| *G06F 3/048* | (2013.01) | |
| *G06F 3/0485* | (2013.01) | |
| *G06F 3/0481* | (2013.01) | |
| *G06F 9/44* | (2006.01) | |
| *G06F 3/0482* | (2013.01) | |
| *G06F 3/0483* | (2013.01) | |
| *G06F 3/0488* | (2013.01) | |

(52) U.S. Cl.
CPC ............ *G06F 3/0485* (2013.01); *G06F 3/0482* (2013.01); *G06F 3/0483* (2013.01); *G06F 3/04817* (2013.01); *G06F 3/04883* (2013.01); *G06F 9/4443* (2013.01)

(58) Field of Classification Search
CPC .................................................. G06F 3/04883
USPC .................................................. 715/784, 835
See application file for complete search history.

(56) References Cited

U.S. PATENT DOCUMENTS

| | | | |
|---|---|---|---|
| 6,448,987 B1* | 9/2002 | Easty et al. | 715/834 |
| 2005/0108657 A1* | 5/2005 | Han | 715/827 |
| 2005/0257166 A1* | 11/2005 | Tu | 715/787 |

(Continued)

FOREIGN PATENT DOCUMENTS

EP    2503444 A2    9/2012

OTHER PUBLICATIONS

"Gestures & Navigation with the HTC Windows Phone 8X (PM23300)", Retrieved at <<http://www.att.com/esupport/article.jsp?sid=KB417082&cv=821&title=Gestures%20#fbid=XX_vloRwPpH>> Retrieved Date: Feb. 27, 2013, pp. 2.
Direct Manipulation (Windows), Retrieved at <<http://msdn.microsoft.com/en-us/library/windows/desktop/hh446969%28v=vs.85%29.aspx>> Retrieved Date: Feb. 27, 2013, pp. 6.

(Continued)

*Primary Examiner* — Dino Kujundzic
*Assistant Examiner* — Carl Lobo
(74) *Attorney, Agent, or Firm* — Bryan Webster; Judy Yee; Micky Minhas

(57) ABSTRACT

Described herein are techniques to facilitate efficient application navigation by a user. In one embodiment, two or more scrollable surfaces contain application icons. One surface may have a first type of application icon and may be a user-customized surface akin to a desktop. Usually, only one of the surfaces is active and displayed at a given time. The user can swap one surface into view and the other surface out of view. The active surface is independently scrollable; when a given surface is swapped out and then swapped back in, despite any scrolling of the intervening surface, when the given surface is swapped back into view it returns at the same position it had before being swapped out. Another embodiment may provide optimizations to enhance performance and responsiveness by pre-rendering imagery of an off-screen surface. Caching logic may be used to assure that the imagery is correct.

18 Claims, 9 Drawing Sheets

(56) References Cited

U.S. PATENT DOCUMENTS

| | | |
|---|---|---|
| 2010/0162180 A1 | 6/2010 | Dunnam et al. |
| 2011/0131532 A1* | 6/2011 | Russell et al. ................ 715/835 |
| 2011/0181526 A1 | 7/2011 | Shaffer et al. |
| 2012/0242598 A1* | 9/2012 | Won et al. ..................... 345/173 |
| 2012/0304107 A1 | 11/2012 | Nan et al. |
| 2012/0313876 A1* | 12/2012 | Smith ........................... 345/173 |
| 2013/0047105 A1 | 2/2013 | Jarrett et al. |

OTHER PUBLICATIONS

"Swipe Views", Retrieved at <<http://developerandroid.com/design/patterns/swipe-views.html#detail-views>>, Aug. 15, 2012, pp. 3.

"Brave NUI World", Retrieved at <<http://bravenuiworld.blogspot.in/2008_11_01_archive.html>>, Nov. 12, 2008, pp. 5.

"International Search Report & Written Opinion for PCT Patent Application No. PCT/US2013/059566", Mailed Date: Jan. 15, 2014, Filed Date: Sep. 13, 2013, 15 Pages.

* cited by examiner

START AND APPLICATION NAVIGATION

BACKGROUND

It has long been known how to provide user interfaces for navigating and launching applications available on a computing device. In particular, some implementations have used scrollable desktops or user shells with icons for invoking applications. Recently, these types of user interfaces have become more complex and may handle an increasing number of applications. The number of icons or tiles representing respective applications may become cumbersome. A desktop, start screen, application management user interface, or functional equivalents, may allow a user to manage burgeoning application icons by manually configuring a desktop or the like. A user may choose to include only some icons that are frequently used. However, this may leave the user with only inefficient ways to access infrequently used applications that are not included in the application navigator or launcher, start screen, graphical user shell, etc.

Techniques related to efficient navigation between scrollable application surfaces are discussed below.

SUMMARY

The following summary is included only to introduce some concepts discussed in the Detailed Description below. This summary is not comprehensive and is not intended to delineate the scope of the claimed subject matter, which is set forth by the claims presented at the end.

Described herein are techniques to facilitate efficient application navigation by a user. In one embodiment, two or more scrollable surfaces contain application icons. One surface may have a first type of application icon and may be a user-customized surface akin to a desktop other user interfaces for application control and management (icon type differences may be visual, functional, or otherwise, as discussed further below). Usually, only one of the surfaces is active and displayed at a given time. The user can swap one surface into view and the other surface out of view. The active surface may be independently scrollable; when a given surface is swapped out and then swapped back in, despite any scrolling of the intervening surface, when the given surface is swapped back into view it returns at the same position it had before being swapped out. Another embodiment may provide optimizations to enhance performance and responsiveness by pre-rendering imagery of an off-screen surface. Caching logic may be used to assure that the imagery is correct.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Embodiments discussed below relate to efficient navigation between independently scrollable application surfaces. A general system with two independently scrollable surfaces will be described first. Details of how to alternate between the two independently scrollable surfaces will be discussed next, followed by discussion of optimizations to enhance performance and provide a fluid user experience.

Figure 1:
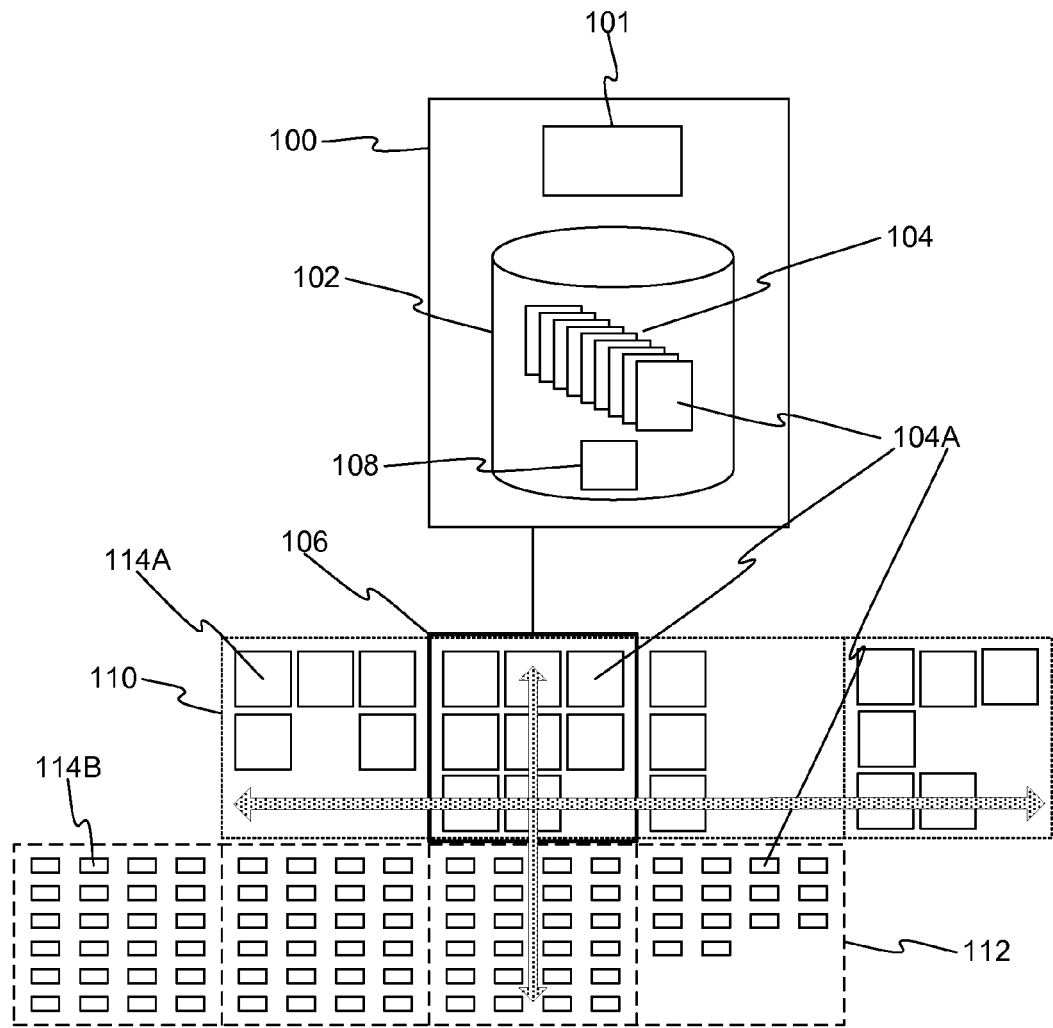
FIG. 1 shows a multi-surface user interface.

FIG. 1 shows a multi-surface user interface. A computing device 100 has a processor 101, storage 102 storing applications 104 installed on the computing device, and a display 106, which may integrated with or detached from the computing device. The computing device also has one or more input devices, such as a touch-sensitive or pressure-sensitive surface, a microphone, a mouse or equivalent, a camera-based motion recognition system, and so forth. A navigation application 108 (e.g., a user-shell, a window manager, one of the applications 104, etc.) is also installed. The navigation application 108 provides a user interface (UI) with user interface elements shown in the figure below the computing device 100.

The user interface may include, among other things, a first pannable or scrollable surface 110 and a second pannable or scrollable surface 112. For ease of discussion, only two surfaces are discussed herein, but the embodiments described below are trivially extensible to more than two surfaces; any embodiment or claim herein is considered to implicitly refer to two or more surfaces. Also, where the display 106 is described in relation to user interfaces, a sub-area of the display, such as a view, a window, a display area, etc., will be equally applicable. In other words, mention of display 106, according to context, also implicitly describes discrete managed sub-areas of the display.

The surfaces 110, 112, each have icons 114A, 114B representing respective applications 104. The icons 114A, 114B may also be referred to as graphical application representations, tiles, etc. Note that there might be more than one type of graphical element in one view or surface. In one embodiment, the icons 114A, 114B are merely interactive user interface elements that can be activated or selected by a user to launch corresponding applications ("launch" meaning bring to the fore and possibly also initiate execution). In other embodiments, either or both of the icons 114A, 114B have additional features for managing the icons, for managing the applications, or other related to the applications or icons. For example, an icon, may be interacted with to activate a menu with items such as "uninstall", "resize", "move", "pin", "unpin", "open location", "run as administrator", "restart", and so on. An icon in both surfaces may represent a same application, as indicated for example application 104A. Icons in both surfaces may also tie into a same underlying application management framework.

In one embodiment, the icons 114A in first surface 110 have different traits than the icons 114B in second surface 112. For example, the icons 114A in the first surface 110 may be dynamic tiles or icons that over time display updated content from the corresponding application. The icons 114B in the second surface 112 may be static tiles or icons that are smaller and do not display dynamic content, although, as noted above, in some embodiments there is no restriction on which types of tiles or icons can be added to which surfaces. In yet another embodiment the first surface 110 is configured manually by the user, for example by pinning applications to the first surface 110, removing icons, turning dynamic content on and off, etc., whereas the icons 114B in the second surface 112 represent "all" of the applications 104 or are icons that are automatically added whenever a new application is installed. Either or both surfaces may be equipped with functionality such as view filtering, view sorting, searching, and others. Any combination of icon types and features, and any kind of surface behavior may be used in either or both of the two surfaces 110, 112.

Regarding scrolling or panning, at any given time when not transitioning between surfaces, one of the surfaces is currently active and displayed by the display 106 (or, as noted above, a display sub-area such as a programmatic view, a window, etc.) In the example shown in FIG. 1 the first surface 110 is the active or current surface. The active surface may be panned or scrolled either incrementally between discrete sections indicated by the vertical dashed lines, or smoothly at any position between the ends of the surface. Typically, a user will provide input to scroll the surface. In the case of touch input or the like, the navigation application 108 handles the user input by scrolling the active surface, causing different of the icons 114A, 114B to scroll into and out of view on the display 106. As will be described next, the user may also provide inputs that are interpreted as indicating an intent to display an inactive or off-screen surface.

Figure 2:
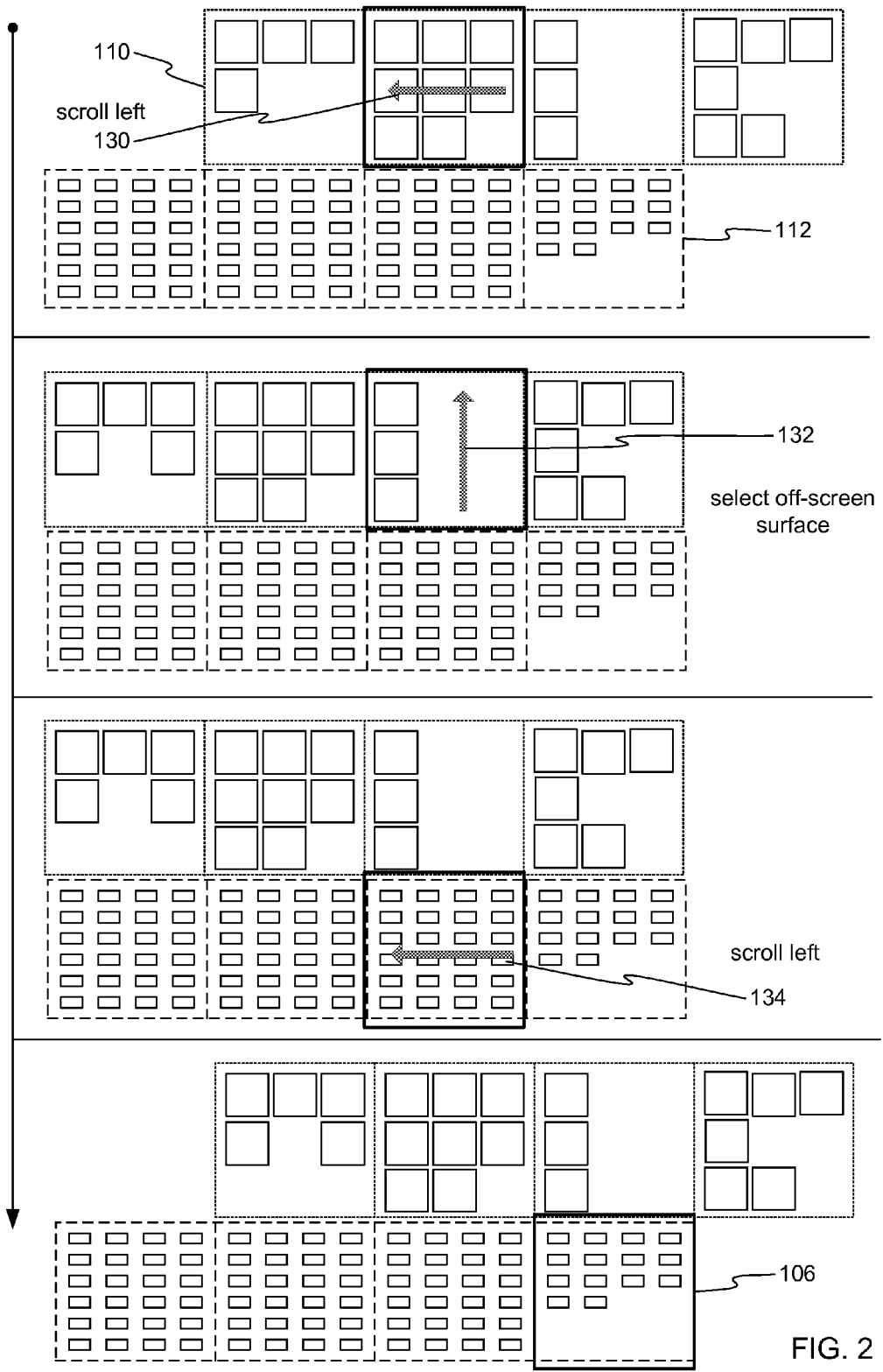
FIG. 2 shows a sequence of a user alternating between surfaces.

FIG. 2 shows a sequence of a user alternating between surfaces. Starting chronologically at the top of FIG. 2, initially, the first surface 110 is displayed in the display 106 and can be scrolled (either surface may be the default or initial view). The second surface 112 is not displayed. The user provides an input such as a stroke to the left, a keypress, a voice command, etc., which is interpreted as a "scroll left" command 130. In the second frame of FIG. 2 the active first surface has scrolled left. Another user input is received, for example a stroke upward. This input is interpreted as a command 132 to make off-screen second surface the active surface. Consequently, as shown in the third frame, the second surface is now the active surface and available for scrolling input. Yet another input is received, for example a designated keypress or dragging of a scrollbar, and another scroll left command 134 is invoked, this time scrolling the second surface, as shown in the last frame of FIG. 2.

Figure 3:
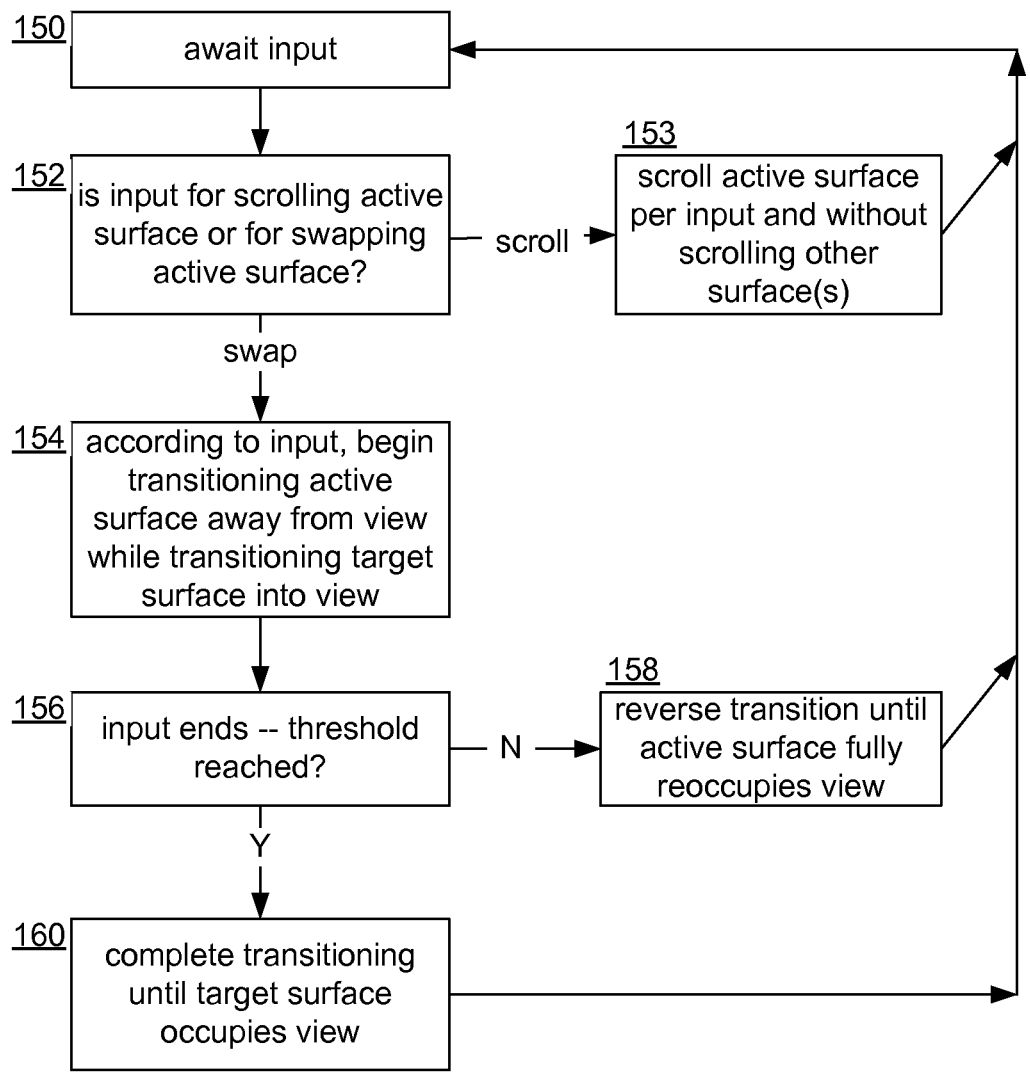
FIG. 3 shows a process for handling scrolling and surface-swapping.

FIG. 3 shows a process for handling scrolling and surface-swapping. Initially, the navigation application 108 or other program awaits input at step 150. When an input is received, step 152 determines if the input is for scrolling or for swamping in a new active surface. If the input is for scrolling, then at step 152 the active surface is scrolled according to the input. If the input indicates that a surface is to be swapped into the view or display, then at step 154 a transition process begins. A transition, described in detail further below, may provide the illusion that the two swapping surfaces are conjoint. For example, a transition may show the current surface moving out of view as a surface targeted by the input moves into view. This might involve showing a leading edge of the target surface (such as a frame or header, and/or a background image) adjacent to a departing edge of the active surface as the new edge peeks into the view.

At step 156, if the input is of a continuous type (e.g., holding a key, a movement or contact of a finger, a mouse drag, etc.), then when the input ends there a determination if a swap condition has been met. For example, a threshold distance might be reached. In another example, a threshold speed is detected regardless of whether input has ended. If the swap condition is not met then at step 158 the transition is visually reversed (if applicable) and process resumes at step 150 to await further input. If the swap condition is met then at step 160 the transition may complete automatically, resulting in the departing surface no longer being displayed and the target surface occupying the display or view and available to be scrolled.

Figure 4:
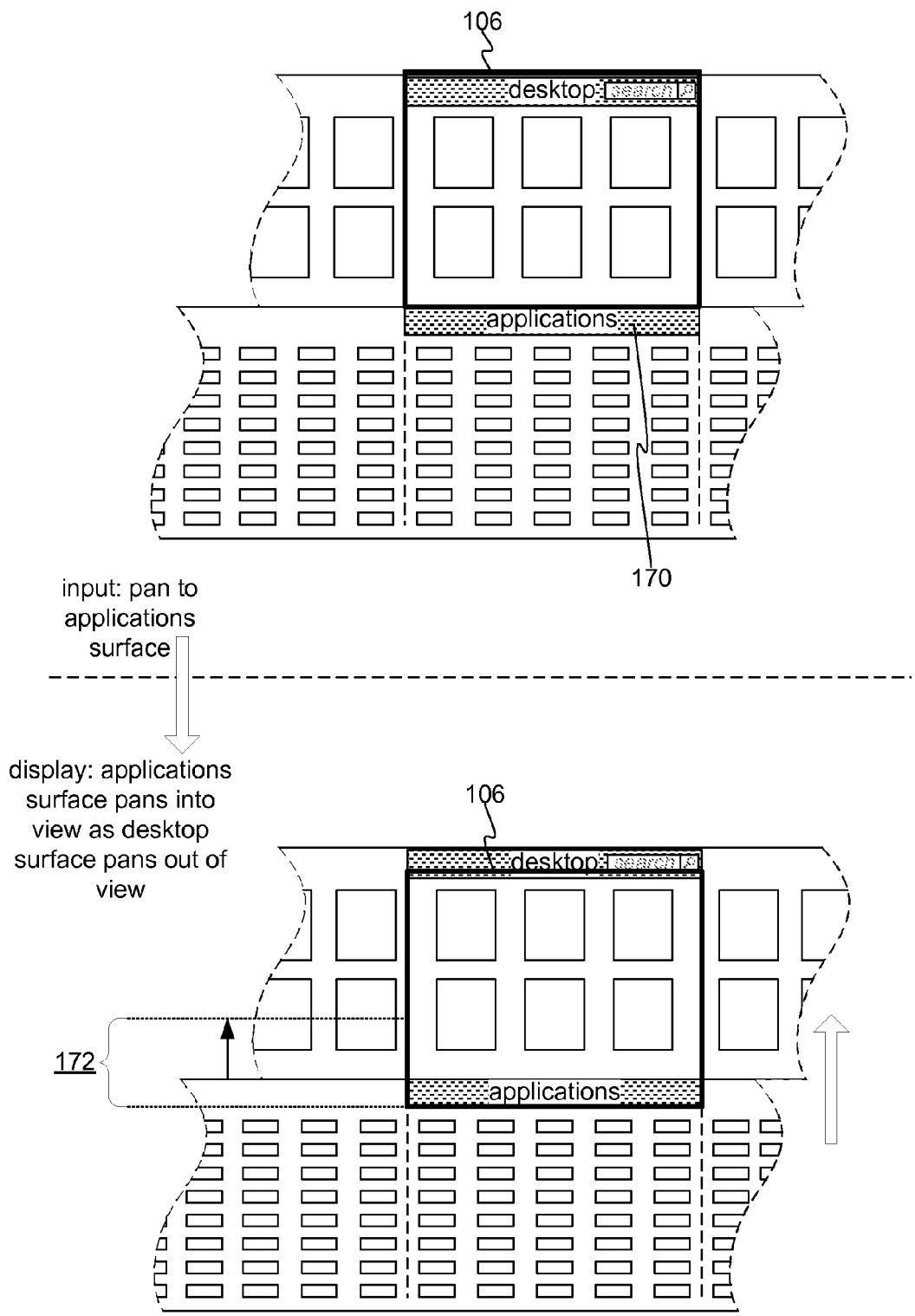
FIG. 4 shows detail of a surface swap transition.
Figure 5:
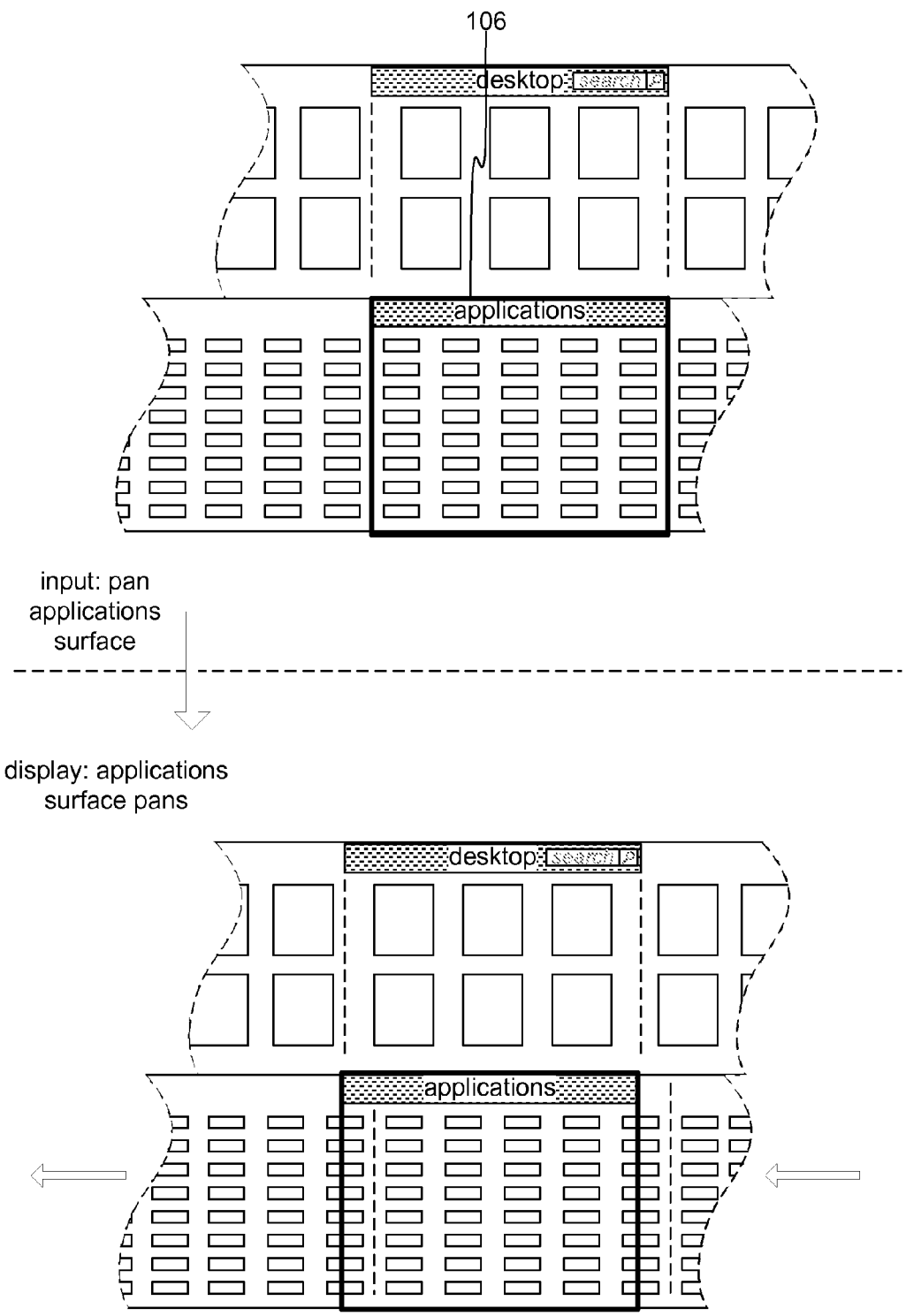
FIG. 5 shows scrolling a surface after a swap.

FIG. 4 shows detail of a surface swap transition. In this example, the lower surface is an "applications" surface that has static application icons and the upper surface is a similar type of surface that might have dynamic application icons, application representations, tiles, etc. It should be noted that either or both surfaces may be heterogeneous or homogenous with respect to the types of application representations contained therein. Responsive to a user input, the lower surface begins to peek up from the bottom of the display 106. If the lower surface has a static element such as a header 170, then the header begins to appear at the bottom of the display as the upper surface begins to move up the display. When the surfaces have moved the threshold distance 172 then the swap may automatically complete; the surfaces are automatically moved upward until the applications surface is fully displayed. FIG. 5 shows scrolling a surface after a swap. Continuing from the example of FIG. 4, after the applications surface occupies the display 106 (top of FIG. 5) the user inputs a pan command and the applications surface pans in the display. The desktop surface remains in memory so that when desired it can be swapped back to the display; the same region that was in view before the swap may again be shown by the display, despite the panning of the applications surface.

Figure 6:
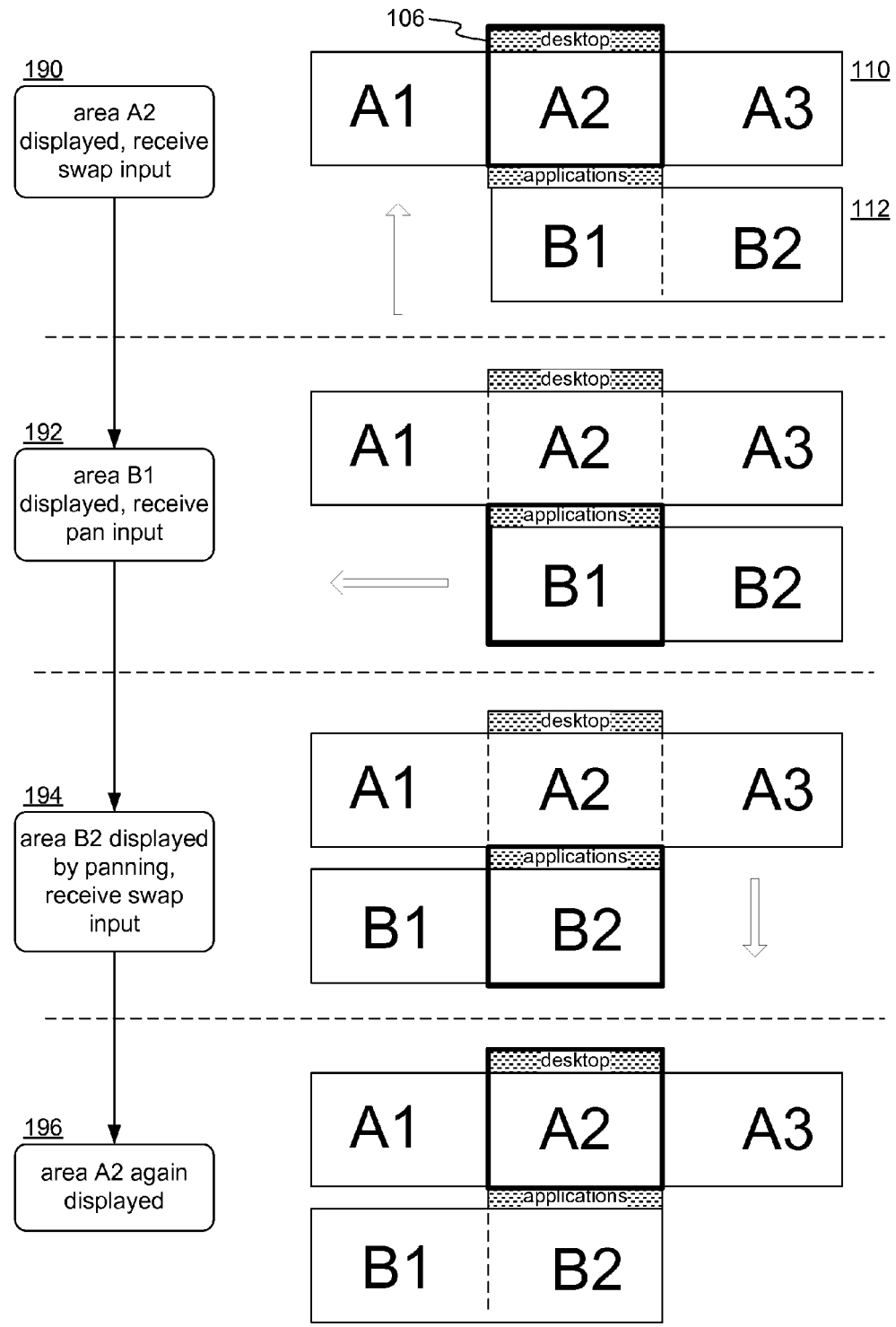
FIG. 6 shows an example of how surfaces can pan independently.

FIG. 6 shows an example of how surfaces pan independently. Initially at step 190 area A2 is displayed. Responsive to a user input the lower surface swaps into view at area B1. At step 192 a user input is received that causes the lower surface to pan to the left which brings section B2 into view. At step 194 another user input pulls area A2 of the upper surface into view and pushes area B2 of the active surface down the display and out of view. At step 196 the upper surface is again available for panning. In some embodiments, including those described next, the surfaces may scroll in unison rather than independently.

Figure 7:
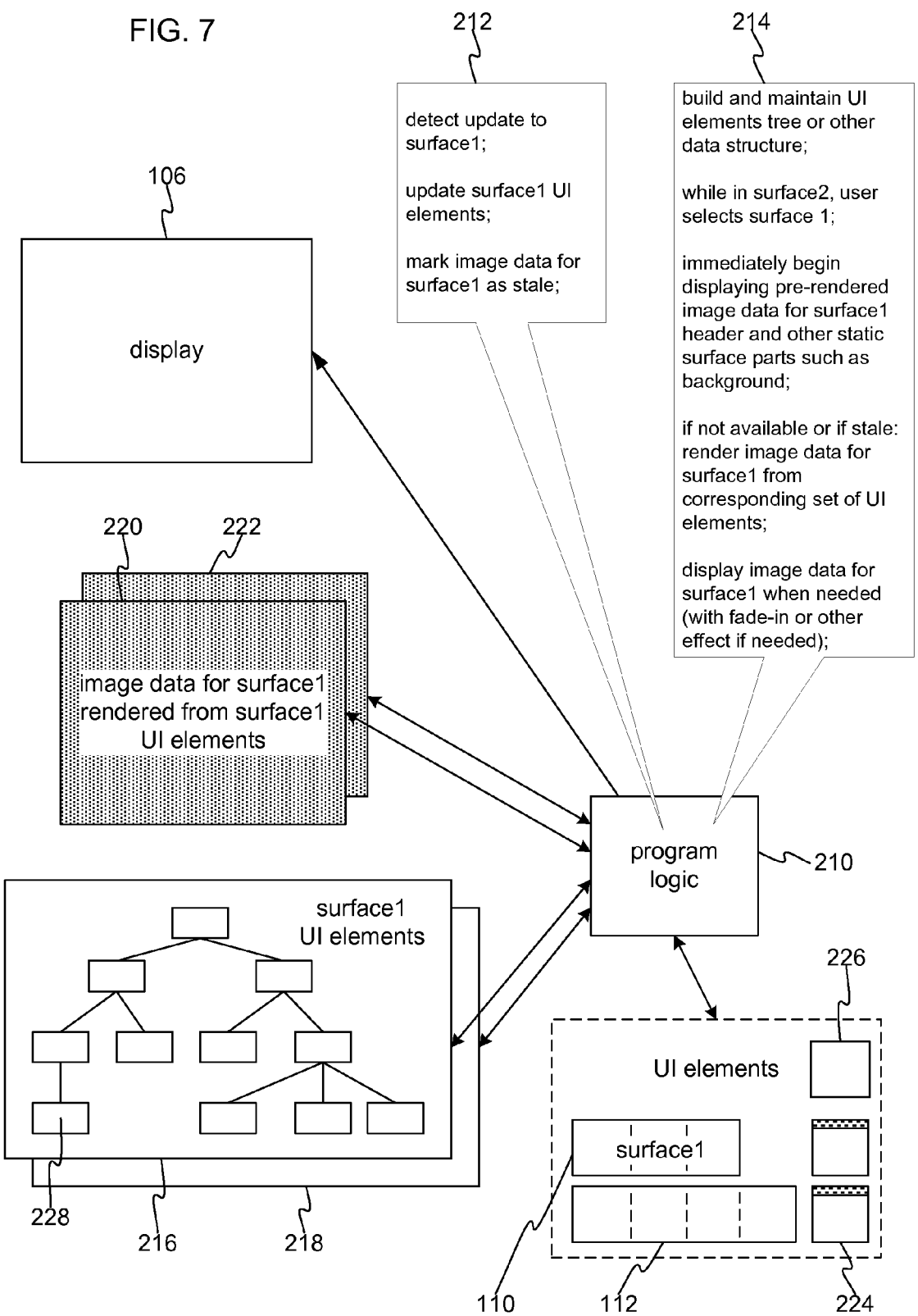
FIG. 7 shows an embodiment with image caching to enhance appearance during a surface swap.

FIG. 7 shows an embodiment with image caching to enhance appearance during a surface swap. Some computing devices and program environments such as a managed code environment may not render a complex user interface (such as a pannable surface) with sufficient speed to be responsive to a swap. Program logic 210 may be implemented to enhance speed and reduce memory use.

Program logic 210 performs smart image caching. The program logic 210 performs two processes 212 and 214 to use and maintain data structures 216, 218 and image data 220, 222. The data structures 216, 218 track user interface elements of a surface. Briefly, the program logic 210 uses the data structures 216, 218 to render image data of surfaces and their content. The pre-rendered image data 220 222 facilitates rapid display of imagery of the surfaces when a swap begins. The actions of the program logic and how it optimizes performance are described next.

At an opportune time, for instance shortly after the navigation application 108 begins executing, the program logic 210 parses through the surfaces to identify the user interface elements thereof that are painted to the display when the surfaces are to be displayed. Such user interface elements may be frames and headers 224, search tools, hot buttons, surface backgrounds 226, and icons 114A, 114B, to name a few examples. The program logic 210 accumulates the relevant user interface elements into the data structures 216, 218.

The data structures may be a collection, hierarchy, or other arrangement of references 228 to the user interface elements. The program logic 210 uses the data structures 216, 218 to pre-render image data mirroring appearance the surfaces would have if displayed by the graphics environment. The image data may be divided into parts so that there is separate image data for static elements such as headers and separate image data for dynamic elements such as application icons.

The program logic 210 may detect updates that affect dynamic content of a surface. For example, event handlers may be attached to objects that implement the surfaces. The program logic 210 may also receive notifications when application icons are rearranged, added, removed, etc. In effect, any event that can change the displayed appearance of a surface is detected. When such an event is detected the program logic 210 may perform various actions. For example, the data structures 216, 218 may be updated, image data might be re-rendered, and/or image data might be marked as stale. If appearance-affecting events occur frequently it may be most efficient to simply mark image data as stale and re-render when needed. In other cases it may be preferable to re-render the image data every time surface appearance changes. Moreover, the appearance tracking may isolate only the portion of a surface that is active or would be active if a swap occurs. Operation of the program logic 210 for swapping is discussed next.

Figure 8:
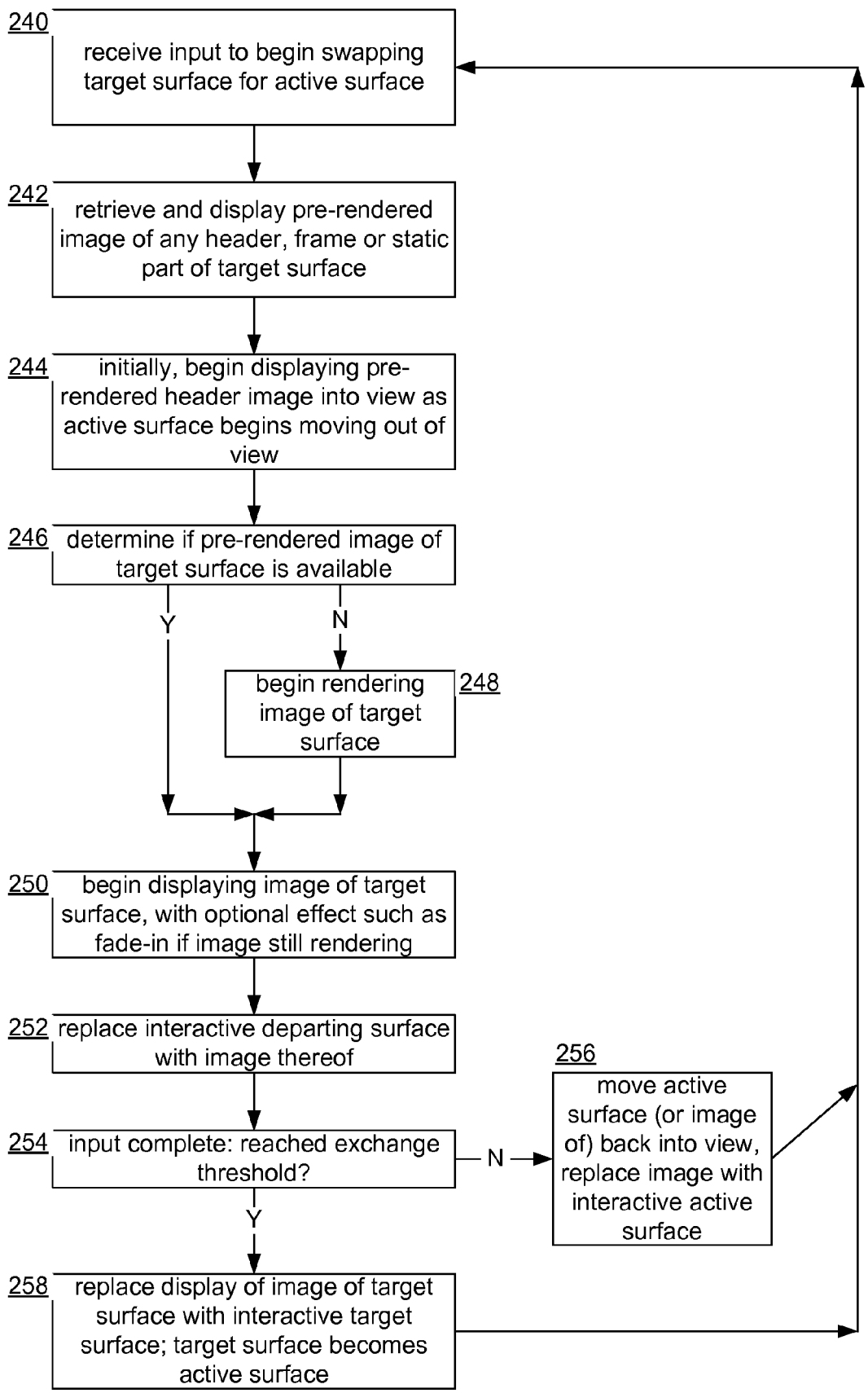
FIG. 8 shows a process for using cached image data to enhance swapping performance.

FIG. 8 shows a process for using cached image data to enhance swapping performance. At step 240 an input initiates swapping, as previously described. At step 242 pre-rendered static image data such as an image of a surface header is retrieved and begins to be displayed immediately. That is, pre-rendered imagery of the target surface begins to be displayed at step 244 as emerging from whichever edge of the display 106 is indicated by the user input. At step 246 the process checks to see if image data for the dynamic surface elements is available and/or not marked stale. If the image data is not available or is stale then the image data is rendered from the data structures at step 248. At step 250 the image data of the target surface begins to be displayed. If the image data had to be newly rendered at step 248 and is not yet fully rendered then as the target surface pans into view the rendered (or partly rendered) dynamic image data may be faded into view as it moves and as the image data becomes available. Although the use of pre-rendered image data for the target surface has been discussed, pre-rendered image data for the active departing surface can similarly be used.

While the pre-rendered image data is being used an active display instance of the target surface may be being prepared. At step 252, optionally, the pre-rendered image data is replaced by display of the interactive target surface. This step may occur while transitioning or when transitioning is complete. Because the interactive target surface and the pre-rendered image data have the same appearance and the same (or nearly) location when switched, the use might not perceive that a static image of the target surface has been replaced by the interactive surface itself. In an implementation where such a switch occurs before the transition is complete, it might be the case that the pre-rendered image data (representing the emerging surface) has not reached a threshold distance, speed, or other condition that indicates that a swap has been triggered. If necessary, at step 256 any pre-rendered image data of the active (and returning to normal position) surface is switched out for the surface itself. Assuming that the surface swap is to be completed, then at step 258, upon or near completion of the swap (when the target surface or image data thereof occupies the display 106), the image data of the target surface is replaced with a display of the now-active target surface.

In one implementation, the thresholds mentioned earlier may act as a mandatory swap point. When such a threshold is reached automatic completion of the swap takes over regardless of the user input.

Among the various mechanisms for a user to trigger a surface swap, a self-revealing gesture may also be used. When a particular pre-defined user input occurs, such as a click on negative space of a surface (e.g., non-functional background space) may cause a user interface element to be displayed. When the user interface element is activated by the user the swap process begins and completes. Display of this self-revealing gesture may be conditioned on detecting user activity that indicates the user is not aware of a hidden surface, such as a fixed number of logins for a user without accessing the hidden surface. Also, as previously mentioned, panning of either a surface swap or a surface itself may be "on rails", for example, restricted to horizontal or vertical movement relative to the display.

Figure 9:
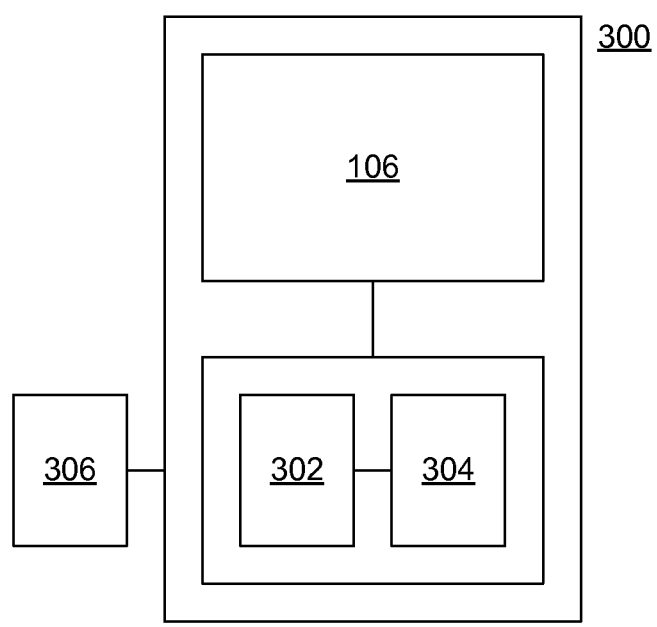
FIG. 9 shows an example of a computing device.

FIG. 9 shows an example of a computing device 300. The computing device 300 may have a display 106, as well as storage 302 and a processor 304. These elements may cooperate in ways well understood in the art of computing. In addition, input devices 306 may be integrated with or in communication with the computing device 300. The display 106 may be a touch-sensitive display that also functions as an input device. The computing device 300 may have any form factor or be used in any type of encompassing device. For example, touch-sensitive control panels are often used to control appliances, robots, and other machines. The computing device 300 may be in the form of a handheld device such as a smartphone, a tablet computer, a gaming device, a server, or others.

Embodiments and features discussed above can be realized in the form of information stored in volatile or non-volatile computer or device readable media (which does not include signals or energy per se). This is deemed to include at least media such as optical storage (e.g., compact-disk read-only memory (CD-ROM)), magnetic media, flash read-only memory (ROM), or any means of storing digital information in a physical device or media. The stored information can be in the form of machine executable instructions (e.g., compiled executable binary code), source code, bytecode, or any other information that can be used to enable or configure computing devices to perform the various embodiments discussed above. This is also deemed to include at least volatile memory (but not signals per se) such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device discussed above.

The invention claimed is:

1. A method performed by a computing device comprising storage, a display, and a processor, the method for a user to selectively alternate between displaying a first surface and displaying a second surface in a view area, either able to be scrolled only in opposite directions of a first linear dimension relative to the view area and only when the other is not displayed in the view area, the method comprising:

displaying the first surface in the view area of the display, the first surface comprising first graphic application representations respectively representing a first set of applications installed on the computing device, wherein the first surface is able to be interactively scrolled by the user, wherein the first surface is interactively scrolled to a scroll position relative to the view area;

receiving a first input indicating that the second surface is to be activated, and in response displaying the first surface moving in a first direction of a second linear dimension out of the view area while displaying the second surface, at a last scrolled position thereof, moving in the first direction of the second linear dimension into the view area until the first surface is no longer displayed in the view area, wherein the second surface comprises second graphic application representations respectively representing a second set of applications installed on the computing device, wherein the second surface is able to be interactively scrolled by the user, wherein the second set of applications is a superset of the first set of applications; and receiving a second input indicating that the first surface is to be activated, and in response displaying the second surface moving in a second direction of the second linear dimension out of the view area while displaying the first surface moving, according to the scroll position thereof, in the second direction of the second linear dimension into the view area until the second surface is no longer displayed in the view area and the first surface is displayed according to the prior scroll position thereof.

2. A method according to claim 1, wherein the first graphic application representations comprise dynamic tiles that dynamically display information according to execution of the respective applications, wherein when a first application representation is selected by the user a corresponding application is launched in response.

3. A method according to claim 1, wherein the second graphic application representations comprise static icons that do not dynamically display information, wherein when a static icon is selected by the user a corresponding application is launched in response.

4. A method according to claim 1, wherein the displaying the second surface moving in the second direction of the second linear dimension comprises displaying the first surface moving adjacent to or in proximity to the second surface.

5. A method according to claim 4, further comprising allowing a user to interactively control concurrent movement of the first surface and the second surface with a single input.

6. A method according to claim 4, further comprising determining, while concurrent movement of the surfaces is being interactively controlled with the single input, if a threshold condition has been satisfied by the concurrent movement, wherein if the threshold condition is determined to be satisfied, the then concurrent movement automatically continues in the second direction of the second linear dimension until the second surface is no longer displayed in the view area, and wherein if the single input ends before the condition is determined to be satisfied then the first surface is automatically moved out of the view area.

7. A method according to claim 1, further comprising allowing the user to manually configure which graphic application representations are included in the first surface, and automatically determining which graphic application representations are included in the second surface.

8. A computing device comprising:

storage hardware, a display, and processing hardware;

the storage hardware storing instructions that when executed by the processing hardware cause the computing device to perform a process comprising:

providing first and second surfaces, the first surface comprising a first set of interactive user interface elements, the second surface comprising a second set of interactive user interface elements, wherein the first set of user interface elements is a superset of the second set of user interface elements;

managing a view area of the display, the managing comprising, wherein when only one of the surfaces is displayed in the view area:

enabling whichever of the surfaces is exclusively displayed in the view area to be interactively scrolled, in only a first linear dimension relative to the display area, to different scroll positions thereof, and enabling swaps, wherein, for each swap, whichever of the surfaces that is the only surface displayed in the view area becomes undisplayed from the view area while the other surface becomes displayed in the view area, wherein a current scroll position of the surface becoming undisplayed is maintained, and the surface becoming displayed is displayed according to a scroll position thereof when last undisplayed from the view area, and wherein while the surfaces are swapping in the view area the surfaces are displayed moving in a first or second direction of a second linear direction.

9. A computing device according to claim 8, wherein when the first surface is becoming displayed during a swap the surfaces move in the first direction of the second linear dimension, and when the second surface is becoming displayed during a swap the surfaces move in the second direction of the second linear dimension.

10. A computing device according to claim 8, wherein movement of the surfaces during a swap is controlled by an interactive user input.

11. A computing device according to claim 10, wherein responsive to a determination that the movement of the surfaces has satisfied a condition, the movement of the surfaces completes automatically without regard for the interactive user input.

12. A computing device according to claim 10, wherein responsive to termination of the interactive user input while the surfaces are moving in one of the directions of the second linear dimension, the surfaces automatically move in the other of the directions of the second linear dimension.

13. A computing device according to claim 8, wherein the interactive user interface elements represent applications on the storage hardware that are executable by the processing hardware.

14. A computing device comprising:

storage, a display, and a processor, the storage storing information to enable the processor, when the computing device is operational, to perform a process for a user to selectively alternate between displaying a first surface and displaying a second surface in a view area of the display, either able to be scrolled only in opposite directions of a first linear dimension relative to the view area and only when the other is not displayed in the view area, the process comprising:

displaying the first surface in the view area, the first surface comprising first interactive user interface elements, wherein the first surface is able to be interactively scrolled by the user, wherein the first surface is interactively scrolled to a scroll position relative to the view area;

receiving a first input indicating that the second surface is to be activated, and in response displaying the first surface moving in a first direction of a second linear dimension out of the view area while displaying the second surface, at a last scrolled position thereof, moving in the first direction of the second linear dimension into the view area until the first surface is no longer displayed in the view area, wherein the second surface comprises a second set of interactive user interface elements that is a superset of the first set of interactive user interface elements, and wherein the second surface is able to be interactively scrolled by the user; and receiving a second input indicating that the first surface is to be activated, and in response displaying the second surface moving in a second direction of the second linear dimension out of the view area while displaying the first surface moving, according to the scroll position thereof, in the second direction of the second linear dimension into the view area until the second surface is no longer displayed in the view area and the first surface is displayed according to the prior scroll position thereof.

15. A computing device according to claim 14, wherein the first surface comprises an image comprising static and dynamic regions, the static regions rendered from static portions of the first surface, wherein, in further response to the second input the dynamic regions are rendered according to respective dynamic portions of the first surface, and wherein displaying the first surface comprises displaying the image.

16. A computing device according to claim 14, wherein the interactive user interface elements respectively comprise graphic application representations representing applications installed on the computing device.

17. A computing device according to claim 14, wherein the view area comprises a user interface element other that the first and second surfaces, and wherein the user interface element of the view area is persistently displayed in the view (i) when either surface is exclusively displayed in the view area and/or (ii) when the surfaces are moving in unison in the view.

18. A computing device according to claim 17, wherein the view area and the user interface element thereof are stationary relative to the display when one of the surfaces scrolls in the first linear dimension.

* * * * *